W. L. HUBBELL.
Hay Loader.

No. 39,655.

2 Sheets—Sheet 1.

Patented Aug. 25, 1863.

Witnesses:
Lemuel W. Serrell
Chas. H. Smith

Inventor:
W. L. Hubbell

W. L. HUBBELL.
Hay Loader.

No. 39,655.

2 Sheets—Sheet 2.

Patented Aug. 25, 1863.

Witnesses:
Lemuel W. Serrell
Chas. H. Smith

Inventor:
W. L. Hubbell

UNITED STATES PATENT OFFICE.

WILLIAM L. HUBBELL, OF BROOKLYN, NEW YORK.

IMPROVEMENT IN HAY-LOADERS.

Specification forming part of Letters Patent No. 39,655, dated August 25, 1863.

*To all whom it may concern:*

Be it known that I, WILLIAM L. HUBBELL, of Brooklyn, in the county of Kings and State of New York, have invented and made a certain new and useful Improvement in Machinery for Raking and Loading Hay; and I do hereby declare the following to be a full, clear, and exact description of the said invention, reference being had to the annexed drawings, making part of this specification, wherein—

Figure 1:
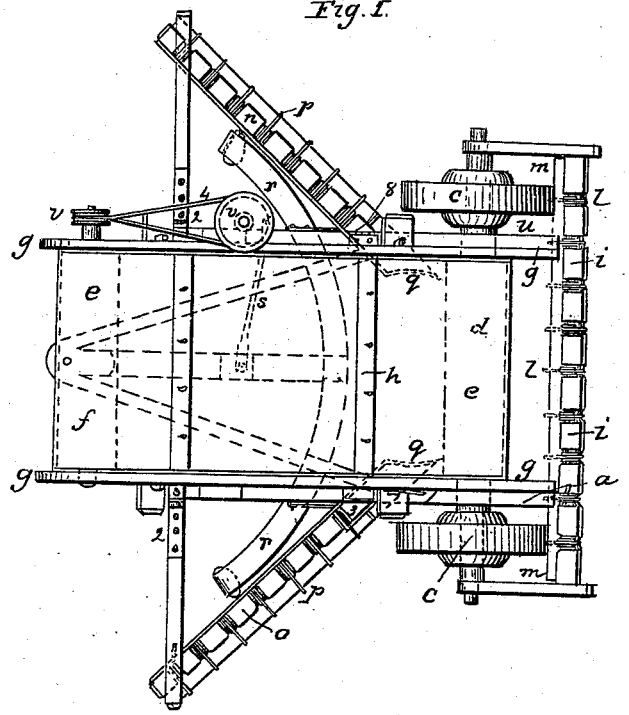
Figure 3:
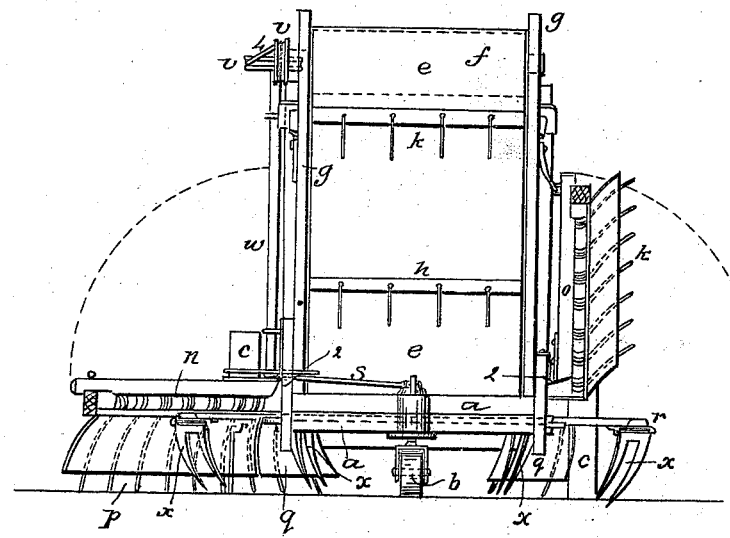
Figure 2:
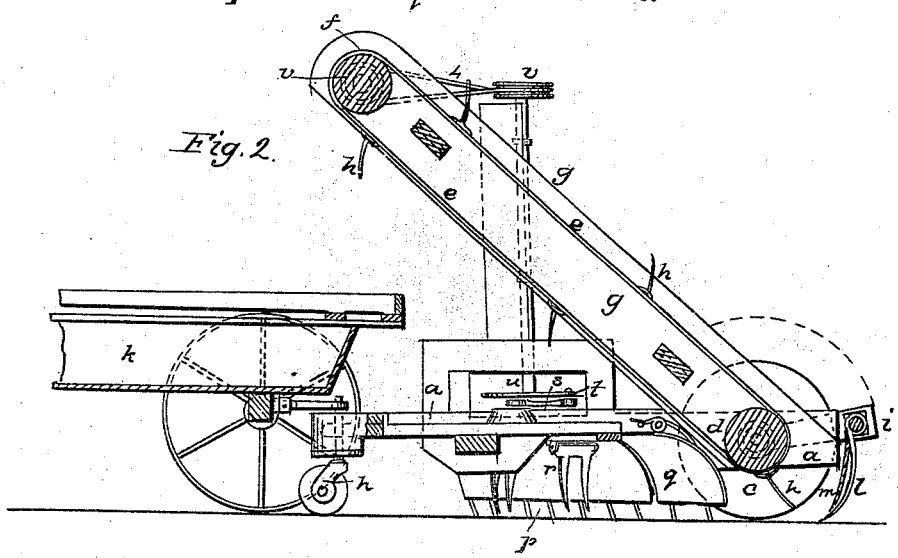

Figure 1 is a plan of my machine. Fig. 2 is a vertical section of the same, showing also a portion of the cart to receive the hay; and Fig. 3 is a front elevation.

Similar marks of reference denote the same parts.

Machines have heretofore been made for loading hay and grain upon a cart by means of an inclined apron, and rakes have also been constructed with spring-tines to gather the hay into rows or cocks.

The nature of my said invention consists in an arrangement of rakes for gathering the hay into rows, and in combining therewith an apron to elevate the hay and deliver it upon the cart.

In the drawings, $a$ is a frame sustained at the front end on the caster-wheel $b$, and at the back end by the wheels $c\ c$, one of which is attached to and rotates the axle that is formed near the middle as a roller or drum, $d$, around which is the endless apron $e$, that passes in an inclined position to and around the roller $f$ at the upper end of the inclined frame $g$ over $a$, and the tension of this apron is sufficient to rotate this roller $f$ and the parts taking motion therefrom, as hereinafter described. Upon this apron are rake-bars with tines $h$, which take the hay as gathered at the roller $d$, as hereinafter shown, and carry it up the incline with the apron, as the same is moved by drawing the machine along, and deliver said hay into any suitable cart or wagon. I have represented a portion of such wagon at $k$, united by a bolt and link to the frame $a$ near the caster $b$, so that the machine will be drawn along behind the cart or wagon by horses or otherwise, as usual.

In order to gather the hay together near the lower end of the elevating-apron, I make use of the rake-head $i$ and spring-tines $l$, connected to the frame $a$ by arms in such a manner that said rake can hang down in position to be operative, as seen in Fig. 2, or be turned, as indicated by the dotted line, when the said machine is being conveyed to or from the field. A hook at 1 may be provided for retaining the rake when turned up.

The sheet-metal guard $m$ may be applied in front of the rake-tines to aid in retaining the hay.

Figure 4:
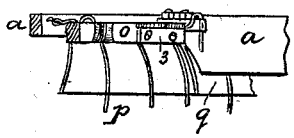

Diagonal side rakes, $n$ and $o$, are provided, the same being connected to the frame $a$ by hinges at 2 3, and the hinges 3 at the rear end of the frame of the diagonal rakes are provided with a vertical arm or bar through an eye on the hinge extending to the rake-head, as seen in the detached view, Fig. 4, so that the rake can rise and fall with inequalities in the surface passed over, the forward end of the rake turning on the hinge 2 as it rises, while the arm at the back end of the rake slides vertically in the eye on the hinge 3. Either or both these side diagonal rakes may be turned up for transportation. One of them is represented as turned up in Fig. 3. Each of these rakes $n$ and $o$ is to be formed with spring-tines $p$, and with a sheet-metal guard in front of the tines to facilitate the passing of the hay toward the center of the machine.

$q\ q$ are rake-sections continuing on the line of the rakes $n$ and $o$, which sections are secured to the frame $a$.

$r$ is a vibrating rake having an arm extending to a center near the caster $b$, and this rake is moved by means of a link, $s$, connecting the said rake with a crank-pin, $t$, on the lower side of an arm or disk at the end of the vertical shaft $u$, that receives motion by the pulleys $v$ and $w$ and belt 4 from the axis of the roller $f$. Miter-gearing might be substituted for these pulleys and belt. The teeth or prongs $x$ of this vibrating rake are set to swing in one direction, being sustained at their upper ends by eyes and having a projecting heel, so that they will only swing toward the center part of the rake. The action of this vibrating rake is to sweep the hay toward the center from in front of each of the inclined rakes $n$ and $o$, and in going back over the hay the said prongs $x$ swing up so as to move over the hay without disturbing the same.

By this machine the hay may be raked together and form a row, if desired, by leaving off the elevating-belt and turning up the rake $i$, because the inclined rakes keep gathering the hay constantly, while the vibrating rakes clear these inclined rakes and deliver the hay at the center part of the machine.

What I claim, and desire to secure by Letters Patent, is—

1. The diagonal rakes $n$ and $o$, fitted as specified, in combination with the rake $i$ and elevating-apron $e$, as set forth.

2. The vibrating rake or sweep $r$, fitted with swinging prongs, substantially as specified, in combination with the diagonal rakes $n$ and $o$ to gather the hay toward the center, as set forth.

In witness whereof I have hereunto set my signature this 10th day of June, 1863.

W. L. HUBBELL.

Witnesses:
 LEMUEL W. SERRELL,
 CHAS. H. SMITH.